(No Model.)

T. LACEY.
SNAP HOOK.

No. 525,607. Patented Sept. 4, 1894.

Witnesses
J. W. Reynolds
Chas. S. Hyer

Inventor
Thomas Lacey
By
John Wedderburn
Attorney

UNITED STATES PATENT OFFICE.

THOMAS LACEY, OF FORT BENTON, MONTANA.

SNAP-HOOK.

SPECIFICATION forming part of Letters Patent No. 525,607, dated September 4, 1894.

Application filed March 7, 1894. Serial No. 502,712. (No model.)

*To all whom it may concern:*

Be it known that I, THOMAS LACEY, a citizen of the United States, residing at Fort Benton, in the county of Choteau and State of Montana, have invented certain new and useful Improvements in Snap-Hooks; and I do hereby declare the following to be a full, clear, and exact description of the invention, such as will enable others skilled in the art to which it appertains to make and use the same.

This invention relates to snap hooks for harness; and aims to provide a hook for the purpose designed, in which the movable part will be held against the hook proper by the tension on the strap or other part of the harness to which the device is applied.

The improvement consists of the novel construction and the peculiar disposition of the parts hereinafter more particularly set forth and pointed out in the claim.

Figure 1:
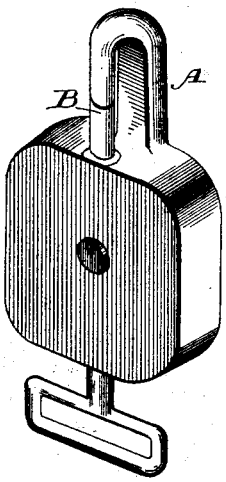
Figure 3:
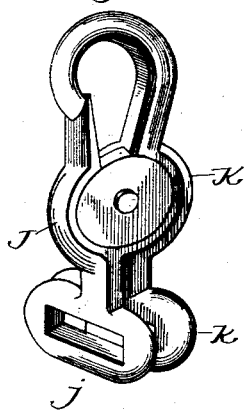
Figure 4:
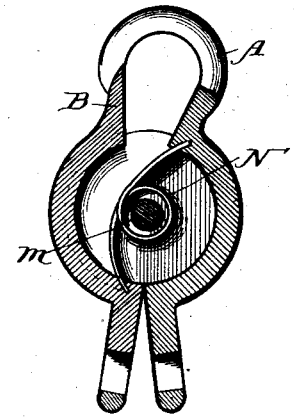
Figure 2:
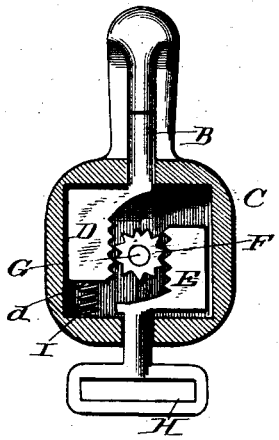
Figure 5:
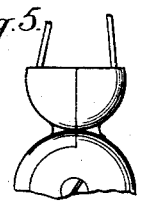
Figure 6:
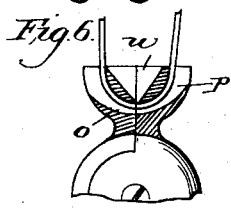

In the accompanying drawings:—Figure 1 is a perspective view of a snap hook embodying the invention. Fig. 2 is a front elevation of the same, the obverse plate of the case being removed. Fig. 3 is a perspective view of a modified form of snap hook. Fig. 4 is a front elevation of the device shown in Fig. 3, part of it in section. Fig. 5 is a modified form of the loop ends of the snap hook shown in Figs. 3 and 4. Fig. 6 is a cross-section of the modification shown in Fig. 5.

A represents the hook proper and B the movable part which is held against the end of the hook proper by the tension on the strap. In the device shown in Figs. 1 and 2 the hook A projects from one end of the case C, which forms a housing for the ratchet plates D and E which have their toothed edges in engagement with a toothed pinion F mounted on a journal G. The movable part or latch B is attached to the plate D and a loop H is attached to the plate E. A spring I interposed between the end of one of the plates and the end of the case, serves, under normal conditions to hold the latch B and the loop H projected. As shown, this spring I is interposed between the end of the plate D and the lower end of the case C, being held in place by a projection $d$ on the end of the said plate. To open the latch B, the loop H is pressed in, which through the pinion F, operates to withdraw the latch B and admit of the hook receiving a ring or other portion of the harness to be engaged by the device.

In the form of hook shown in Figs. 3 and 4, the hook proper and the latch form integral portions of pivoted members J and K, which have loops $j$ and $k$, respectively. Under normal conditions, these loops $j$ and $k$ stand apart, as shown most clearly in Fig. 4, and the latch B is in contact with the end of the hook A. The middle portions of these members are circular, the part K being flanged to receive the circular portion of the part J, the two being held together by a pivot $m$. A spring N, coiled between its ends and preferably mounted on the pivot $m$, has its opposite ends engaged with the members J and K to hold them in the position shown in Fig. 4. A strap passed through the loops $j$ and $k$ and subjected to tension, serves to press the said loops together and the latch B more firmly against the hook A. To release the snap hook or apply the same to a portion of the harness, it is necessary that the loops $j$ and $k$ be separated, which operation serves to move the latch B from the end of the plate A and admits of the device receiving the ring for being applied to the required part of the harness.

It will be observed that the essential feature of the invention is the application of the device to a strap or other portion of the harness, whereby the latch and hook will be more firmly held together the greater the strain or tension on the said strap.

Referring to Figs. 5 and 6 it will be seen that the looped ends of the parts J and K have flanged side pieces $m$ between which cross-bars $n$ and $o$ are disposed. A curved slot $p$ is formed between the cross-bars $n$ and $o$ for the passage of the strap. The outer face of the cross-bar $n$ is curved to prevent abrasion of the strap. The flanges $m$ on the same side form an approximately semi-circular head when brought together. After the snap is attached to a ring, the strain on the strap will lock the parts together, so to speak, and prevent the device from becoming unhooked.

Having thus described the invention, what is claimed as new is—

In a snap hook, the combination of a latch and a loop each having a toothed plate, and a pinion meshing with the teeth of each plate, whereby the movement of the latch or loop in one direction will produce a corresponding movement of the other part in the opposite direction, substantially as specified.

In testimony whereof I have signed this specification in the presence of two subscribing witnesses.

THOMAS LACEY.

Witnesses:
CASSIUS M. LANNING,
JOHN H. GREEN.